(12) United States Patent
Riccobene et al.

(10) Patent No.: US 11,348,564 B2
(45) Date of Patent: May 31, 2022

(54) PRODUCTION METHOD FOR AN ACOUSTIC PANEL COMPRISING INSERTS

(71) Applicant: Airbus Operations SAS, Toulouse (FR)

(72) Inventors: Theo Riccobene, Reze (FR); Hassan Menay, Nantes (FR); Jacques Lalane, Saint Orens de Gameville (FR); Alain Porte, Colomiers (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 405 days.

(21) Appl. No.: 16/460,714

(22) Filed: Jul. 2, 2019

(65) Prior Publication Data

US 2020/0013385 A1   Jan. 9, 2020

(30) Foreign Application Priority Data

Jul. 4, 2018 (FR) ...................... 1856166

(51) Int. Cl.
*G10K 11/168* (2006.01)
*B32B 3/12* (2006.01)
(Continued)

(52) U.S. Cl.
CPC ............ *G10K 11/168* (2013.01); *B32B 3/12* (2013.01); *B32B 3/266* (2013.01); *B32B 7/12* (2013.01);
(Continued)

(58) Field of Classification Search
CPC ......... G10K 11/168; B32B 3/12; B32B 3/266; B32B 7/12; B32B 27/06; B32B 2307/102;
(Continued)

(56) References Cited

U.S. PATENT DOCUMENTS 8,336,671 B2 * 12/2012 Kondo ................... F02B 77/13
181/205
9,659,556 B1 * 5/2017 Pierce ................. G10K 11/172
(Continued)

FOREIGN PATENT DOCUMENTS

FR   2839075 A1   10/2003
FR   2942166 A1   8/2010
(Continued)

OTHER PUBLICATIONS

French Search Report; priority document.

*Primary Examiner* — Forrest M Phillips
(74) *Attorney, Agent, or Firm* — Greer, Burns & Crain, Ltd.

(57) ABSTRACT

A production method for an acoustic panel comprising a step of producing a composite structure, a step of providing inserts, wherein each insert comprises a nozzle formed as a hollow cylinder with a through-bore and a cap comprising a base formed as a cylinder and a cover formed as a cone, and wherein the base is accommodated in the bore, a step of positioning the inserts in the composite structure by penetration of the cover into the composite structure so that the bore opens at one side and the other of the composite structure, a step of polymerizing during which the composite structure with the inserts is polymerized, a step of removing the caps, a first step of fixing a honeycomb structure to the polymerized composite structure, and a second step of fixing a rear skin to the honeycomb structure.

6 Claims, 2 Drawing Sheets

(51) Int. Cl.
    *B32B 3/26* (2006.01)
    *B32B 7/12* (2006.01)
    *B32B 27/06* (2006.01)
    *F02C 7/045* (2006.01)
    *F02C 7/24* (2006.01)
    *B64D 33/02* (2006.01)

(52) U.S. Cl.
    CPC .............. *B32B 27/06* (2013.01); *F02C 7/045* (2013.01); *F02C 7/24* (2013.01); *B32B 2307/102* (2013.01); *B32B 2605/18* (2013.01); *B64D 2033/0206* (2013.01); *F05D 2250/283* (2013.01)

(58) Field of Classification Search
    CPC ........ B32B 2605/18; F02C 7/045; F02C 7/24; B64D 2033/0206; F05D 2250/283
    See application file for complete search history.

(56) References Cited

U.S. PATENT DOCUMENTS

| | | |
|---|---|---|
| 2004/0023026 A1 | 2/2004 | Rambaud et al. |
| 2012/0168248 A1* | 7/2012 | Burak .................. G10K 11/172 181/292 |
| 2018/0044002 A1* | 2/2018 | Cotton .................. B64C 27/008 |
| 2018/0166058 A1 | 6/2018 | Delehouze et al. |
| 2018/0230063 A1* | 8/2018 | Delehouze ............ C04B 37/005 |
| 2019/0189102 A1* | 6/2019 | Vyas .......................... B32B 7/12 |
| 2020/0291645 A1* | 9/2020 | Scamardo ................ B32B 3/12 |
| 2021/0237890 A1* | 8/2021 | Porte ..................... B32B 37/146 |

FOREIGN PATENT DOCUMENTS

| | | | |
|---|---|---|---|
| FR | 3039147 A1 | 1/2017 | |
| FR | 3039148 A1 | 1/2017 | |
| KR | 20140007236 A * | 1/2014 | ............ B01D 69/10 |

\* cited by examiner

PRODUCTION METHOD FOR AN ACOUSTIC PANEL COMPRISING INSERTS

CROSS-REFERENCES TO RELATED APPLICATIONS

This application claims the benefit of the French patent application No. 1856166 filed on Jul. 4, 2018, the entire disclosures of which are incorporated herein by way of reference.

FIELD OF THE INVENTION

The present invention relates to a production method for an acoustic panel which comprises inserts, an acoustic panel obtained using such a production method, an aircraft nacelle comprising such an acoustic panel, an aircraft comprising at least one such nacelle.

BACKGROUND OF THE INVENTION

An aircraft propulsion system comprises an engine, in particular a turbojet engine, and a nacelle which surrounds the engine. In order to absorb the noise generated by the engine, the nacelle comprises acoustic panels. Each acoustic panel comprises a composite structure to which a structure in the form of a honeycomb and a rear skin are successively fixed.

The composite structure is orientated towards the flow of air which passes through the nacelle and it is drilled with holes in order to allow the passage of acoustic waves towards the honeycomb structure.

Although such an acoustic panel is entirely satisfactory, the new generations of engines generate noises at lower frequencies. In order to absorb such frequencies, it is necessary to reduce the diameter of the holes. The drilling of the polymerized composite structure with tools is limited to holes of 1 mm in diameter and the drilling may further bring about a severing of the composite fibers of the composite structure.

In order to improve the absorption of these new frequencies, it is desirable to find a method which enables an acoustic panel to be produced with a new architecture and which has, in particular, holes with a very small diameter.

SUMMARY OF THE INVENTION

An object of the present invention is to provide a production method for an acoustic panel which enables acoustic waves which have low frequencies to be absorbed.

To this end, a production method for an acoustic panel is proposed, the production method comprising:
- a production step during which a composite structure is produced,
- a provision step during which inserts are provided and in which each insert comprises a nozzle in the form of a hollow cylinder with a through-bore and a cap which comprises a base in the form of a cylinder and a cover in the form of a cone, and in which the base is accommodated in the bore,
- a positioning step during which the inserts are positioned in the composite structure by means of penetration of the cover into the composite structure so that the bore opens at one side and the other of the composite structure,
- a polymerization step during which the composite structure with the inserts is polymerized,
- a removal step during which the caps are removed,
- a first assembly step during which a honeycomb structure is fixed to the polymerized composite structure, and
- a second assembly step, during which a rear skin is fixed to the honeycomb structure.

Such a production method enables an acoustic panel to be obtained which has holes with a very small diameter, in particular less than 1 mm, which ensures better attenuation of the acoustic waves of low frequencies.

Advantageously, the provision step is preceded by an overmolding step during which the nozzle is overmolded on the base.

The invention also proposes an insert for implementing the production method according to one of the above variants and comprising a nozzle which is in the form of a hollow cylinder with a through-bore and a cap which comprises a base in the form of a cylinder and a cover in the form of a cone, and in which the base is accommodated in the bore.

The invention also proposes an acoustic panel obtained using a production method according to one of the preceding embodiments.

The invention also proposes a nacelle for an aircraft engine and comprising at least one acoustic panel according to the preceding variant.

The invention also proposes an aircraft comprising at least one nacelle according to the preceding variant.

BRIEF DESCRIPTION OF THE DRAWINGS

The features of the invention set out above, and others, will be appreciated more clearly from a reading of the following description of an embodiment, the description being given in relation to the appended drawings, in which.

DETAILED DESCRIPTION OF THE PREFERRED EMBODIMENTS

Figure 1:
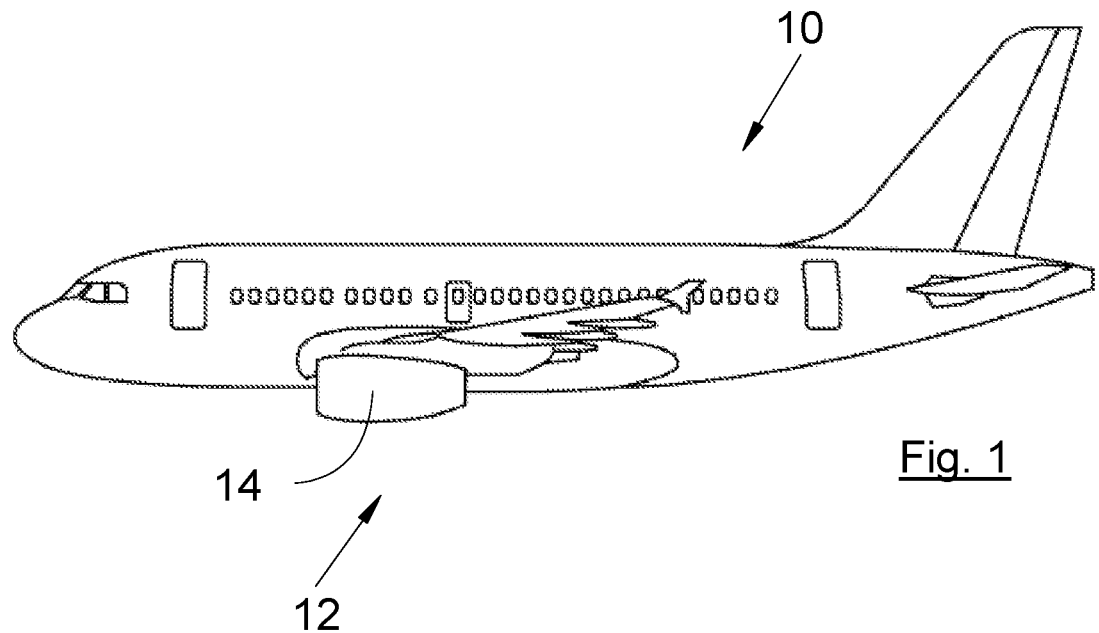
FIG. 1 is a side view of an aircraft according to the invention.

FIG. 1 shows an aircraft 10 which comprises at least one propulsion system 12 which comprises an engine, in particular, a dual-flow turbojet engine, and a nacelle 14 which surrounds the engine.

The nacelle 14 integrates acoustic panels which are arranged around the flow of air which flows through the nacelle 14.

Figure 2:
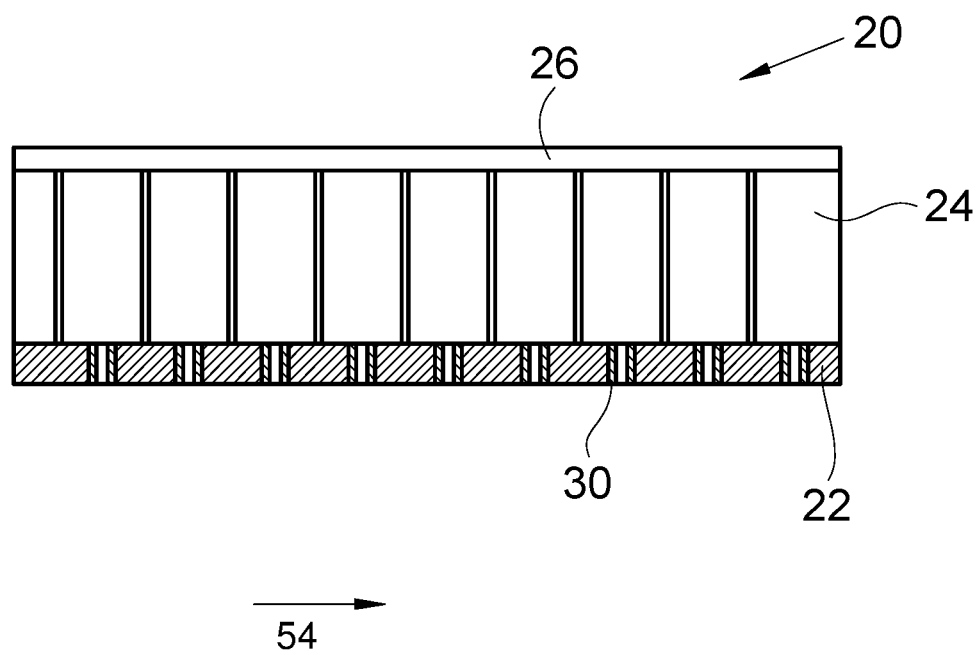
FIG. 2 is a lateral sectioned view of an acoustic panel according to the invention.

FIG. 2 shows the structure of the acoustic panel 20.

The acoustic panel 20 comprises a composite structure 22 which is positioned against the flow of air 54, a honeycomb structure 24 which is fixed to the composite structure 22 and a rear skin 26 which is fixed to the honeycomb structure 24.

The fixing of the honeycomb structure 24 and the rear skin 26 is carried out by means of adhesive bonding.

Figure 3:
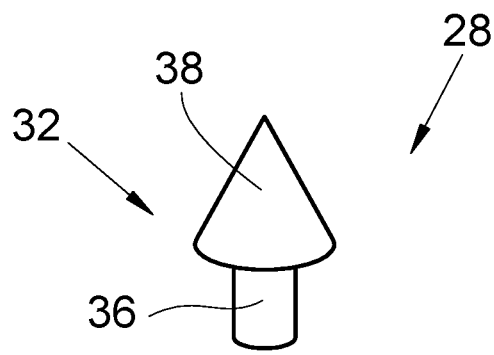
FIG. 3 shows a front insert placed in a composite structure.
Figure 3:
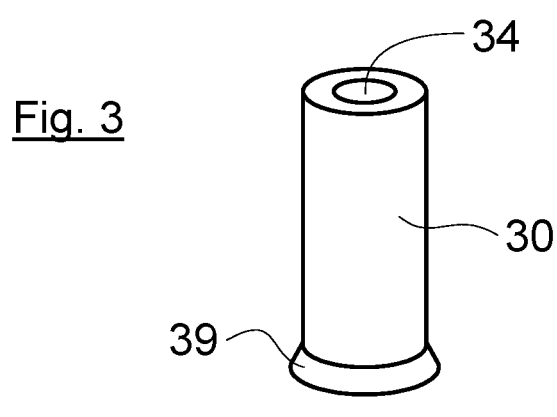

FIG. 3 shows an insert 28 which comprises a nozzle 30 and a cap 32. The nozzle 30 is in the form of a hollow cylinder having a through-bore 34. The cap 32 comprises a base 36 in the form of a cylinder and a cover 38 in the form of a cone. The diameter of the base 36 is adapted to the diameter of the bore 34 in order to enable the insertion of the base 36 in the bore 34 and its removal.

The bore 34 may, in particular, have a small diameter, in particular less than 1 mm.

The composite structure 22 comprises nozzles 30 and each nozzle 30 is embedded in the composite structure 22 so that the bore 34 opens at one side and the other of the composite structure 22. The length of the nozzle 30 is thus at least equal to the thickness of the composite structure 22.

During the production of the composite structure 22, the insert 28 is integrated in the composite structure 22 then the cap 32 is withdrawn in order to leave only the nozzle 30 and thus to release the bore 34. The positioning of the insert 28 is carried out by means of penetration of the cover 38 into the composite structure 22 until the cap 32 emerges from the composite structure 22 and the bore 34 opens at one side and the other of the composite structure 22. The removal of the cap 32 is carried out, for example, by applying a lateral force which enables the cap 32 to be removed from the nozzle 30

Figure 4:
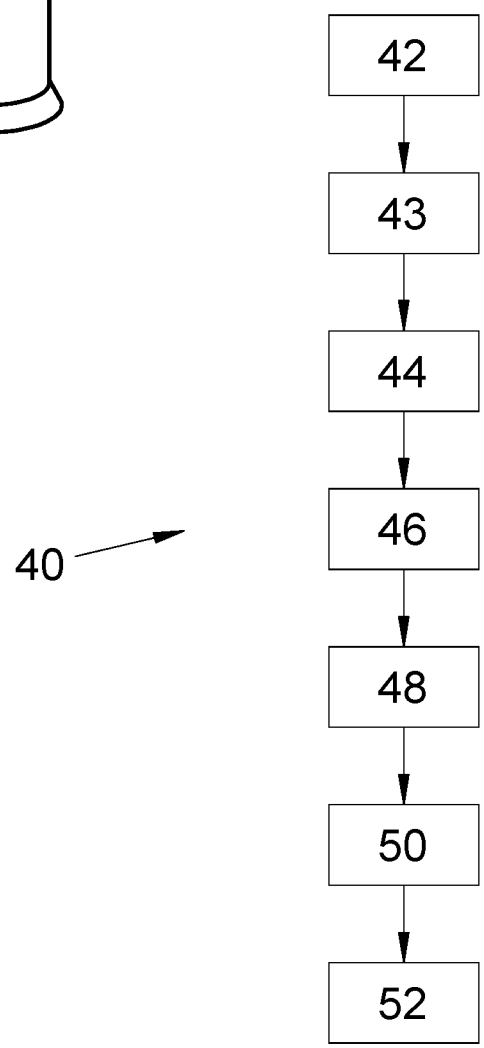
FIG. 4 shows an algorithm of a production method for an acoustic panel according to the invention.

FIG. 4 shows a production method 40 for the acoustic panel 20. The production method 40 comprises:
- a production step 42 during which the composite structure 22 is produced,
- a provision step 43 during which inserts 28 are provided and in which each insert 28 comprises a nozzle 30 which is in the form of a hollow cylinder with a through-bore 34 and a cap 32 which comprises a base 36 in the form of a cylinder and a cover 38 in the form of a cone, and in which the base 36 is accommodated in the bore 34,
- a positioning step 44 during which the inserts 28 are positioned in the composite structure 22 by penetrating the cover 38, that is to say, the cone, into the composite structure 22,
- a polymerization step 46 during which the composite structure 22 with the inserts 28 is polymerized,
- a removal step 48 during which the caps 32 are removed,
- a first assembly step 50 during which the honeycomb structure 24 is fixed to the polymerized composite structure 22, and
- a second assembly step 52 during which the rear skin 26 is fixed to the honeycomb structure 24.

The positioning of the inserts 28 before the polymerization prevents breakage of the composite fibers of the composite structure 22 which are not yet solidified.

Each insert 28 is positioned manually or using an appropriate tool, for example, of the gun type. The cone shape of the cover 38 facilitates the penetration of the insert 28 into the composite structure 22.

The presence of the cap 32 before polymerization prevents the bore 34 from being blocked by resin of the composite structure 22 during the polymerization.

In order to ensure better retention of the nozzle 30 in the composite structure 22 and to reduce the risks of migration of resin of the composite structure 22, the nozzle 30 comprises a widened base 39.

The insertion of the base 36 in the bore 34 may be carried out manually if the nozzle 30 and the cap 32 are produced independently of each other. However, the nozzle 30 is preferably produced by means of overmolding on the base 36.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A production method for an acoustic panel, the production method comprising:
   producing a composite structure in a production step,
   providing inserts in a provision step and in which each insert comprises a nozzle formed as a hollow cylinder with a through-bore and a cap which comprises a base in formed as a cylinder and a cover formed as a cone, and in which the base is accommodated in the through-bore,
   positioning the inserts, in a positioning step, in the composite structure by means of penetration of the cover into the composite structure so that the through-bore opens at a first and a second side of the composite structure,
   polymerizing the composite structure with the inserts in a polymerization step,
   removing the caps in a removal step, wherein the nozzles remain in the composite structure,
   fixing a honeycomb structure to the polymerized composite structure in a first assembly step, and
   fixing a rear skin to the honeycomb structure in a second assembly step.

2. The production method according to claim 1, wherein the provision step is preceded by an overmolding step during which the nozzle is overmolded on the base.

3. An insert for implementing the production method according to claim 1, and comprising a nozzle formed as a hollow cylinder with a through-bore and a cap which comprises a base formed as a cylinder and a cover formed as a cone, and in which the base is accommodated in the through-bore.

4. An acoustic panel formed using a production method according to claim 1.

5. A nacelle for an aircraft engine and comprising at least one acoustic panel according to claim 4.

6. An aircraft comprising at least one nacelle according to claim 5.

* * * * *